B. L. MORRISON.
HOSE CLAMP.
APPLICATION FILED APR. 13, 1908.
925,013.
Patented June 15, 1909.
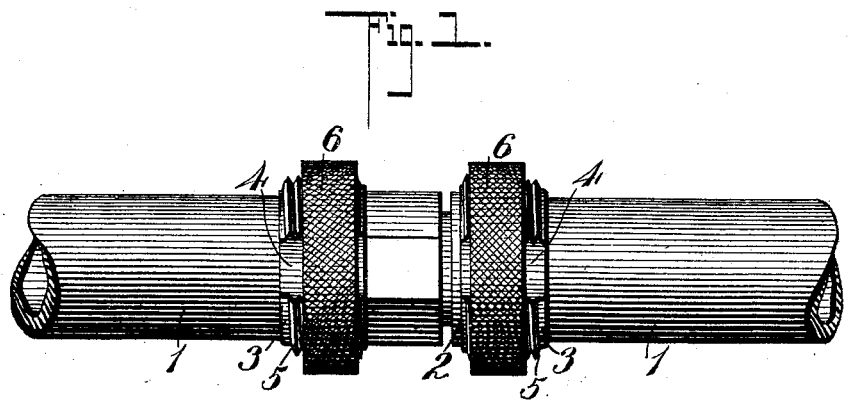
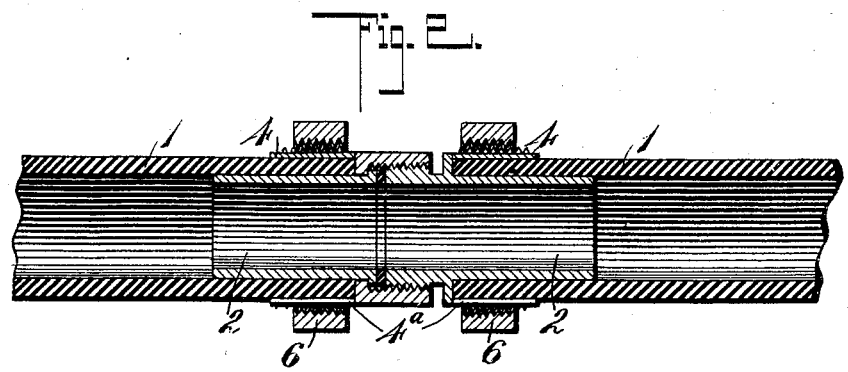
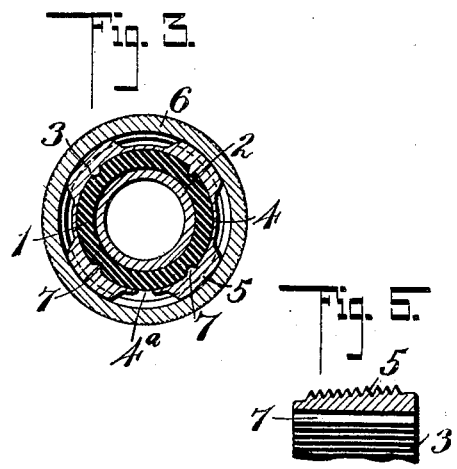
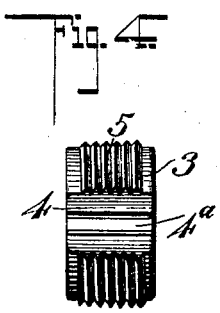
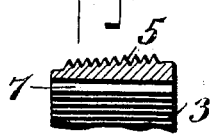
Witnesses
Philip H. Burch
E. B. McBath
Inventor
B. L. Morrison,
By O'Meara & Brock
Attorneys

UNITED STATES PATENT OFFICE.

BYRON L. MORRISON, OF COLORADO SPRINGS, COLORADO.

HOSE-CLAMP.

No. 925,013.  Specification of Letters Patent.  Patented June 15, 1909.

Application filed April 13, 1908. Serial No. 426,901.

*To all whom it may concern:*

Be it known that I, BYRON L. MORRISON, a citizen of the United States, residing at Colorado Springs, in the county of El Paso and State of Colorado, have invented a new and useful Improvement in Hose-Clamps, of which the following is a specification.

This invention is a hose clamp and the object of the invention is a clamp for the purpose of connecting a hose section to a coupling member or discharge nozzle.

The invention consists in the novel features of construction hereinafter described, pointed out in the claims and shown in the accompanying drawings, in which—

Figure 1 is a side elevation illustrating one use of my invention. Fig. 2 is a longitudinal section through Fig. 1. Fig. 3 is a transverse section taken through my clamp, through the hose, and through a coupling member. Fig. 4 is an end elevation of a split clamping ring. Fig. 5 is a detail section taken transversely through a non-reduced portion of the clamping ring.

In these drawings 1 represents a section of hose to be clamped to a coupling member 2. Over said hose section is slipped a cut spring ring 3 which is provided with a plurality of spaced transverse grooves 4, said grooves reducing the thickness of the ring and the non-reduced portions are circumferentially threaded as shown at 5. The ring is cut at 4ª, said cut being preferably made through the longitudinal center of one of the grooves 4. The clamping ring as a whole is tapered, the threads adjacent the outer end of the coupling member being formed upon the thickest portion of the ring as will be obvious from an inspection of Fig. 2. After the ring has been placed in position by slipping it over the hose it is clamped upon the hose and locked in position by a nut 6 which is threaded upon it. It will be obvious that by reason of the tapering of the ring the nut 6 will bind the same tightly upon the hose clamp as it is screwed in place, and the hose section is held tightly between the portion of the coupling member 2 over which the hose is slipped and the spring clamping ring 3. It will also be obvious that the grooves 4 may be of any equal number, according to the size of the clamping ring or according to the width of the grooves and of the various threaded portions.

In the drawings I have shown a ring having four transverse grooves and four non-reduced threaded portions, but it will be obvious that by reducing the width of these portions six of each may be employed without in any way changing the operation of the device, and it will also be obvious that the locking nut 6 may be either rounded or roughened to be turned by the hand, or if desired it may be a polygonal nut to be turned with a wrench.

The split ring 3 is provided with a plurality of interior ribs 7 transversely arranged with respect to the outer threads, and opposite with respect to the grooves 4, so that said ribs are formed upon the thick or non-reduced portions of the ring, the object of these ribs being to provide biting surface for engagement with the hose section and to prevent the clamping ring turning upon said section.

Having thus fully described my invention, what I claim as new and desire to secure by Letters Patent, is:—

A tapering split ring circumferentially threaded, said ring having a plurality of transverse grooves on its outer face cutting through said threads, and having interior, transverse ribs out of alinement with said grooves.

BYRON L. MORRISON.

Witnesses:
 A. H. CLIFFORD,
 MYRON S. LEWIS.